(12) United States Patent
Fabling (10) Patent No.: US 9,022,786 B2
(45) Date of Patent: May 5, 2015

(54) FLIGHT CREW TRAINING SYSTEM

(75) Inventor: Haywood Keith Fabling, Puyallup, WA (US)

(73) Assignee: The Boeing Company, Chicago, IL (US)

( * ) Notice: Subject to any disclaimer, the term of this patent is extended or adjusted under 35 U.S.C. 154(b) by 1603 days.

(21) Appl. No.: 12/250,671

(22) Filed: Oct. 14, 2008

(65) Prior Publication Data

US 2010/0092926 A1     Apr. 15, 2010

(51) Int. Cl.
| | | |
|---|---|---|
| G09B 9/02 | (2006.01) | |
| G09B 9/08 | (2006.01) | |
| A63B 69/36 | (2006.01) | |
| G09B 9/00 | (2006.01) | |
| F41A 33/00 | (2006.01) | |
| G09B 19/16 | (2006.01) | |
| G09B 9/16 | (2006.01) | |
| B64D 47/08 | (2006.01) | |
| A63B 24/00 | (2006.01) | |

(52) U.S. Cl.
CPC .............. *G09B 9/08* (2013.01); *A63B 69/3623* (2013.01); *G09B 9/00* (2013.01); *F41A 33/00* (2013.01); *G09B 19/165* (2013.01); *G09B 9/165* (2013.01); *B64D 47/08* (2013.01); *G09B 9/02* (2013.01); *A63B 2024/0012* (2013.01); *A63B 2220/806* (2013.01)

(58) Field of Classification Search
CPC ....................... A63B 69/3623; A63B 2220/806; A63B 2024/0012; G09B 9/08; G09B 19/165; G09B 9/00; G09B 9/02; G09B 9/165; F41A 33/00; B64D 47/08

USPC .............................. 434/29–30, 32, 37–38, 69
See application file for complete search history.

(56) References Cited

U.S. PATENT DOCUMENTS

| | | | | |
|---|---|---|---|---|
| 3,991,487 | A * | 11/1976 | Bede ................................ | 434/37 |
| 5,286,202 | A * | 2/1994 | de Gyarfas et al. ............. | 434/43 |
| 5,434,571 | A * | 7/1995 | Erle ................................ | 342/36 |
| 6,370,457 | B1* | 4/2002 | Nemeth .......................... | 701/35 |
| 2002/0004695 | A1* | 1/2002 | Glenn et al. .................... | 701/35 |
| 2003/0054323 | A1* | 3/2003 | Skaggs ........................... | 434/29 |
| 2003/0109322 | A1* | 6/2003 | Funk et al. ..................... | 473/222 |
| 2003/0152904 | A1* | 8/2003 | Doty, Jr. ......................... | 434/350 |
| 2005/0202374 | A1* | 9/2005 | Stepanek et al. ................ | 434/37 |
| 2007/0100515 | A1* | 5/2007 | McClure ........................... | 701/3 |
| 2007/0122778 | A1* | 5/2007 | Beitel et al. .................... | 434/219 |
| 2007/0236366 | A1* | 10/2007 | Gur et al. ....................... | 340/945 |

OTHER PUBLICATIONS

Federal Aviation Administration, "Instrument Flying Handbook", 2001, Federal Aviation Administration, p. 1-281.*
Flightglobal, "Flight TV: Boeing 737-NG Simulator at Alteon", Mar. 11, 2007, https://www.youtube.com/watch?v=x5QxMndQdDM, p. 1-139.*
"Flight Data Analysis & Investigation Solution", CEFA Aviation, pp. 1-10, retrieved Feb. 18, 2009 www.cefa-aviation.com.

* cited by examiner

*Primary Examiner* — Jack Yip
(74) *Attorney, Agent, or Firm* — Yee & Associates, P.C.

(57) ABSTRACT

A method is present for flight crew training. Flight crew interactions are recorded during a lesson to form recorded flight crew interactions. Flight deck displays occurring during the lesson are recorded to form recorded flight deck displays. A flight training video is formed from the recorded flight crew interactions and the recorded flight deck displays.

21 Claims, 5 Drawing Sheets

FLIGHT CREW TRAINING SYSTEM

BACKGROUND INFORMATION

1. Field

The present disclosure relates generally to training lessons and in particular to a method and apparatus for flight crew training. Still more particularly, the present disclosure relates to a method, apparatus, and program code for a multimedia flight crew training program.

2. Background

Flight crew training is a course of study followed by one or more flight crew members learning to operate an aircraft. Flight crew training includes a combination of theoretical learning conducted by self paced computer based training (CBT) modules, instructor lead flight training devices (FTD) full flight simulators (FSS), and may include practical exercises conducted with actual aircraft.

A student in a flight crew training curriculum goes through a number of different instructor lead FTD and FFS lessons. Normally, two students are trained together as a flight crew, one as captain and one as the first officer. In preparation for each lesson, each student studies a training manual (TM) and flight crew operations manual (FCOM) to visualize various aircraft systems, operations, procedures, and other information.

These training manuals are in printed form, in which text, pictures, and diagrams are present to prepare for each defined lesson. Further, the training manual may cross reference other manuals, such as the flight crew training manual (FCTM), to obtain more detail.

In preparing for each lesson, the students may review multiple documents or manuals. The students then attends a briefing prior to the scheduled (FTD or FFS) simulator session. The student is required to perform the pre-briefed procedures in the simulator for the particular lesson.

Further, instructors for these flight training curriculums also have an expanded version of the lesson plans for use in identifying details of information to be presented in each lesson.

With these types of manuals, a student is required to mentally visualize the actions to be performed in the simulator session for each lesson. Instructors also are required to interpret what and how training should be performed for each lesson from the expanded training manuals that they receive. The currently available types of training materials may be open to different interpretations by students and instructors. As a result, the materials emphasized and taught may not be standardized around the world in different training locations.

Therefore, it would be advantageous to have a method and apparatus that overcomes the problems described above.

SUMMARY

In one advantageous embodiment, a method is present for flight crew training. Flight crew interactions are recorded during a lesson to form recorded flight crew interactions. Flight deck displays occurring during the lesson are recorded to form recorded flight deck displays. A flight training video is formed from the recorded flight crew interactions and the recorded flight deck displays.

In another advantageous embodiment, a data processing system comprises a bus, a communications unit connected to the bus, a storage device connected to the bus, and a processor unit connected to the bus. The processor unit executes program code to record flight crew interactions during a lesson to form recorded flight crew interactions. The processor unit also executes the program code to record flight deck displays occurring during the lesson to form recorded flight deck displays. The processor unit executes the program code to form a flight training video from the recorded flight crew interactions and the recorded flight deck displays.

In yet another advantageous embodiment, a computer program product is present for flight crew training. The computer program product comprises program code stored on a computer recordable storage medium. Program code is present for recording flight crew interactions during a lesson to form recorded flight crew interactions. Program code is also present for recording flight deck displays occurring during the lesson to form recorded flight deck displays. Program code is present for forming a flight training video from the recorded flight crew interactions and the recorded flight deck displays.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

The different advantageous embodiments recognize that current curriculum requires students to be able to visualize a large range of different systems, operations, procedures, and other suitable material from printed or electronic materials when preparing for lessons. Further, the different advantageous embodiments also recognize that instructors for flight training curriculums also use similar materials. These materials may identify information about goals, teaching points, or procedures to emphasize.

The different advantageous embodiments, however, recognize that currently available instructor materials do not provide a dynamic visual reference of the training. The different advantageous embodiments recognize that the currently used lesson plans are unable to provide the desired standardization in flight training lessons when used by different instructors.

The different advantageous embodiments recognize that it is important to have a consistent standardized flight training course, in which the same information and emphasis for different procedures, operations, and systems are emphasized in the same manner. In other words, additional emphasis for a particular procedure should not be presented by one instructor, with other instructors providing less emphasis for the particular procedure.

Further, the different advantageous embodiments also recognize that current materials do not provide a capability to visualize or review actions taken by flight crew members and instructors during a lesson. The different advantageous embodiments recognize that adequate preparation for a lesson may require longer study times to adequately prepare and/or complete a lesson.

Thus, the different advantageous embodiments provide a method, apparatus, and computer program code for flight crew training. Flight crew interactions are recorded during a lesson along with flight deck displays that occur during the lesson. This recorded information is used to form a flight training video which may be distributed to students and instructors around the world. With the use of this type of flight training video, the lessons may be more easily standardized with different instructors teaching the same lesson.

Figure 1:
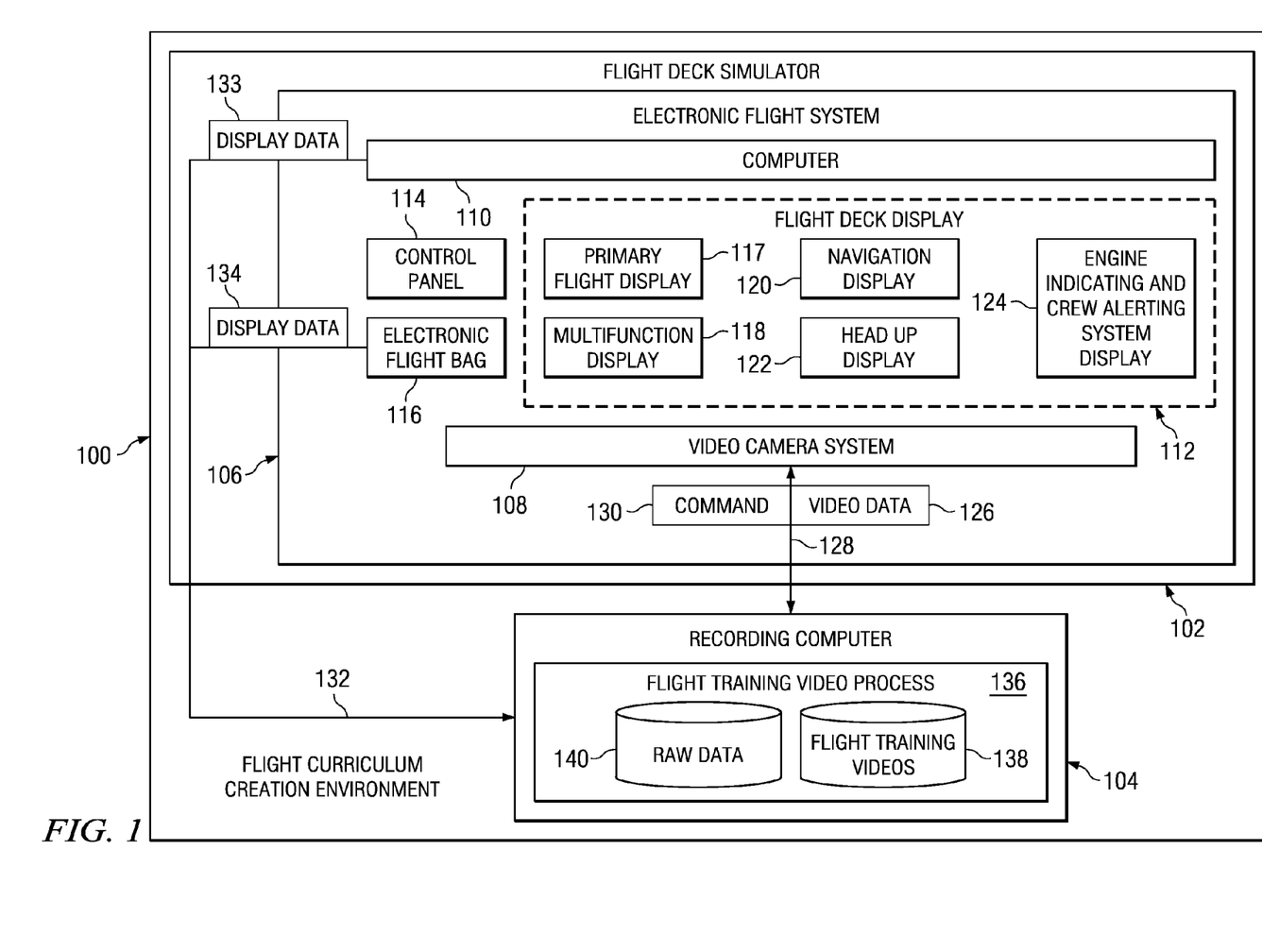
FIG. 1 is a diagram illustrating a flight curriculum creation environment in accordance with an advantageous embodiment.

With reference now to FIG. 1, a diagram illustrating a flight curriculum creation environment is depicted in accordance with an advantageous embodiment. Flight curriculum creation environment 100 includes flight deck simulator 102 and recording computer 104.

Flight deck simulator 102 is a simulator of a flight deck of an aircraft, in which a pilot and other crew members may control an aircraft. Flight deck simulator 102 may be, for example, without limitation, a flight training device and/or full flight simulator. Flight deck simulator 102 may be implemented using any commercially available flight deck simulator along with modifications according to the different advantageous embodiments. In these examples, flight deck simulator 102 may be implemented using a flight deck simulator available from CAE, Inc. and/or Thales.

In this depicted example, flight deck simulator 102 includes electronic flight system 106 and video camera system 108. Video camera system 108 is an example of a modification made to flight deck simulator 102 to record various activities that may occur within flight deck simulator 102. Electronic flight system 106 includes computer 110, flight deck displays 112, and control panel 114. Additionally, electronic flight system 106 also may include electronic flight bag 116.

Computer 110 may execute computer readable program code in a functional form to simulate an aircraft during various phases of a flight. Electronic flight bag 116 is an electronic information device that may include various resources, such as an aircraft operating manuals, airplane performance software, electronic logbook, and navigation charts.

Flight deck displays, in these examples, include a number of different displays. These displays may include, for example, without limitation, primary flight display 117, multifunction display 118, navigation display 120, head up display 122, and engine indicating and crew alerting system (EICAS) display 124.

Primary flight display 117 may provide information such as, for example, airspeed, altitude, heading, attitude, vertical speed, and glideslope. Multifunction display 118 may provide status information about aircraft systems such as, for example, communications, auxiliary power unit (APU), fuel, and electrical systems. Navigation display 120 may present heading/track, flight plan route, waypoint, airport, navigational aid and weather information. Navigation display 120 may provide a moving map type of presentation.

Head up display (HUD) 122 may provide projected airplane flight data on the HUD combiner mounted just in front of the windshield. A head up display combiner is a movable reflective glass surface in these examples. Engine indicating and crew alerting system (EICAS) display 124 may present information about aircraft systems, including propulsion, warnings, flight controls, fuel, and air systems. These displays may mimic traditional gauges while supplying digital readouts of various parameters. Example displays presented for flight deck display 112 may vary, depending on the particular implementation.

In other implementations, other displays may be used in addition to or in place of the displays illustrated in FIG. 1. For example, navigation display 120 and multifunction display 118 may be combined into a single display. In other advantageous embodiments, head up display 122 may not be present.

Control panels 114 provide controls to allow the flight crew to perform various operations during a flight. For example, control panels 114 may be used to select a display range and mode and enter data. Control panels 114, in these examples, also may encompass the control column or yoke.

Video camera system 108 is an additional component that may be installed within flight deck simulator 102. Video camera system 108 may be a number of video cameras that may be positioned within flight deck simulator 102. A number of items, as used herein, refers to one or more items. For example, a number of video cameras is one or more video cameras. Video camera system 108 provides the capability to record crew interactions and instructor actions during a lesson.

Video camera system 108 sends video data 126 to recording computer 104 through communications link 128. Communications link 128 also may be used to carry commands, such as command 130, to control recording activities by video camera system 108.

Additionally, computer 110 and electronic flight bag 116 also are in communication with recording computer 104 through communications link 132. Communications link 132 is added to flight deck simulator 102 to obtain display data 133 from computer 110 and display data 134 from electronic flight bag 116. Display data 133 and display data 134 contain data from flight deck display 112 generated during a lesson. In these examples, this display data includes data from the displays generated during a lesson.

Flight training video process 136, executing on recording computer 104, receives video data 126, display data 133, and display data 134 to generate flight training videos 138. Each video within flight training videos 138 may be for a particular lesson. A flight training video within flight training videos 138 may be for an entire lesson. In some advantageous embodiments, only a portion of a lesson may be repeated, since later lessons include repeat operations from prior lessons. Flight training video process 136 stores video data 126, display data 133, and display data 134 as raw data 140 for use in creating flight training videos 138.

In these examples, flight training video process 136 may be used to edit data within raw data 140 to generate a particular flight training video in flight training videos 138.

After flight training videos 138 have been created, these videos may be distributed for use by instructors and students.

In these examples, both instructors and students receive the same version, which show the exact operations, actions, interactions, and other suitable information that is to be emphasized during a lesson. In this manner, a standardized training program may be established in which the emphasis is the same when presented by different instructors. Flight training videos 138 will provide information to instructors as to what should be emphasized based on the guidance provided in the flight training videos.

The illustration of flight curriculum creation environment 100 in FIG. 1 is not meant to imply physical or architectural limitations to the manner in which different advantageous embodiments may be implemented. For example, in some advantageous embodiments, recording computer 104 may be located in an engineering cabin. In yet other advantageous embodiments, recording computer 104 may be a separate data processing system connected to flight deck simulator 102. Further, recording computer 104 may be located in the same physical location as flight deck simulator 102.

In other advantageous embodiments, recording computer 104 may be in a remote location in which communications links 128 and 132 extend over a network, such as the internet or a wide area network. Other components may be used in addition to or in place of the ones illustrated in FIG. 1. For example, physical crew seating areas are present in flight deck simulator 102 but not shown in this example.

Figure 2:
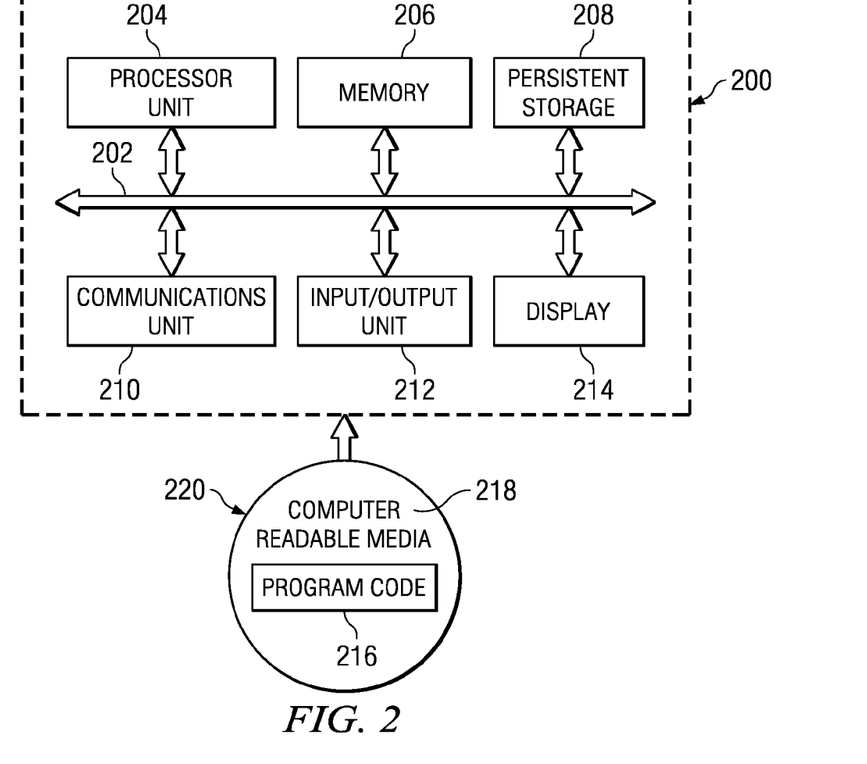
FIG. 2 is a diagram of a data processing system in accordance with an illustrative embodiment.

Turning now to FIG. 2, a diagram of a data processing system is depicted in accordance with an illustrative embodiment. Data processing system 200 is an example of a data processing system that may be used to implement various components in flight curriculum creation environment 100.

For example, data processing system 200 may be used to implement computer 110, electronic flight bag 116, recording computer 104, and any other suitable device within this environment. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation.

For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208.

In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer readable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

In some illustrative embodiments, program code 216 may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 216 may be a server computer, a client computer, or some other device capable of storing and transmitting program code 216.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200.

Other components shown in FIG. 2 can be varied from the illustrative examples shown. The different embodiments may be implemented using any hardware device or system capable of executing program code. As one example, data processing system 200 may include organic components integrated within organic components and/or may be comprised entirely of organic components, excluding a human being. For example, a storage device may be comprised of an organic semiconductor.

As another example, a storage device in data processing system 200 is any hardware apparatus that may store data. Memory 206, persistent storage 208, and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system.

Additionally, a communications unit may include one or more devices used to transmit and receive data, such as a modem or a network adapter. Further, a memory may be, for example, memory 206, or a cache such as found in an interface and memory controller hub that may be present in communications fabric 202.

Figure 3:
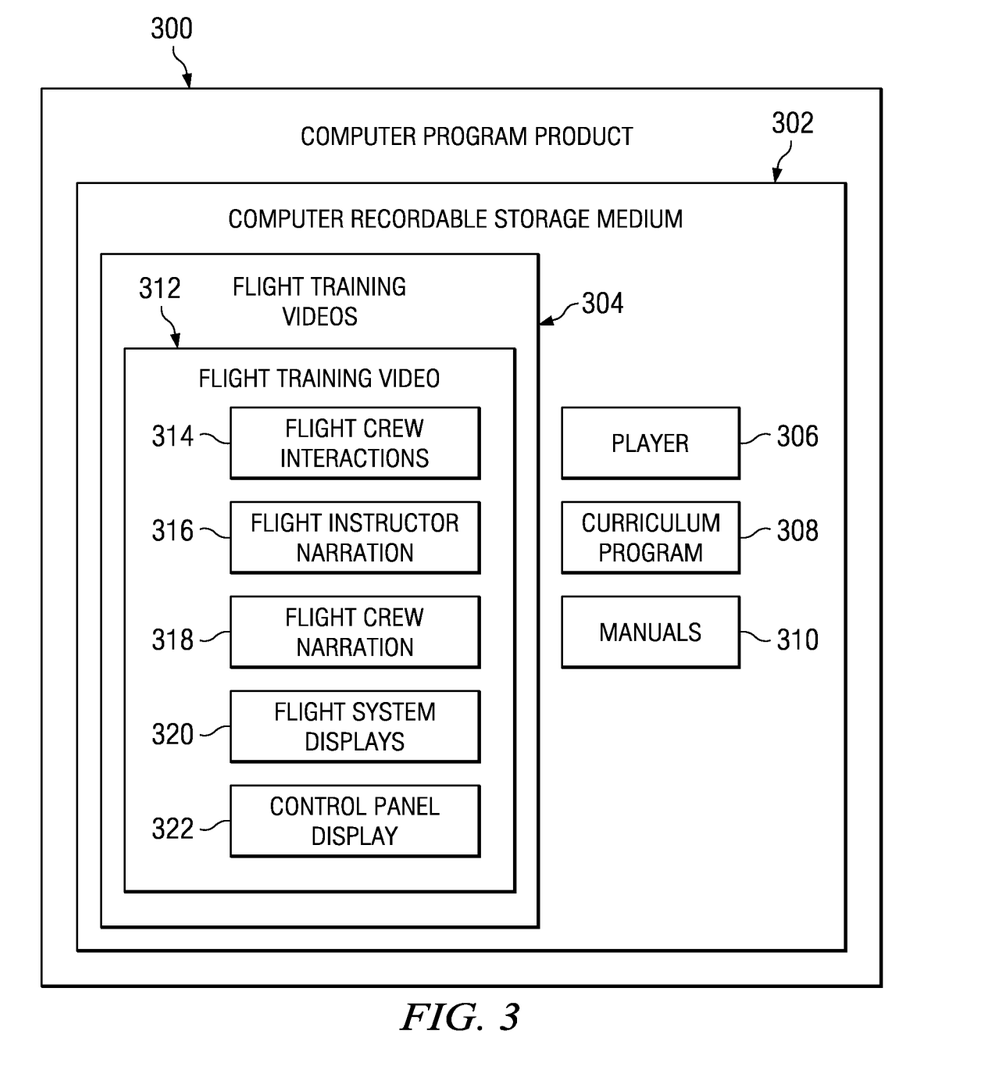
FIG. 3 is a diagram of a computer program product in accordance with an advantageous embodiment.

With reference now to FIG. 3, a diagram of a computer program product is depicted in accordance with an advantageous embodiment. Computer program product 300 is an example of one implementation for computer program product 220 in FIG. 2. In particular, computer program product 300 may be used to transport flight training videos such as, for example, flight training videos 138 in FIG. 1.

In this example, computer program product 300 comprises computer recordable storage medium 302 with flight training videos 304. Computer recordable storage medium 302 also may include player 306, curriculum program 308, and manuals 310. Player 306 may be used to play flight training videos 304. Curriculum program 308 may present lessons using manuals 310. Curriculum program 308 may integrate the use of player 306 to present flight training videos 304, as well as information for manuals 310 when a student and/or instructor prepares for a lesson. Computer program product 300 may be used as part of a computer-based training (CBT) program for students and/or instructors preparing for lessons.

In this example, flight training videos 304 are examples of flight training videos generated using flight curriculum creation environment 100 in FIG. 1. Flight training video 312 is an example of a flight training video within flight training videos 304. In this illustrative example, flight training video 312 includes flight crew interactions 314, flight instructor narration 316, flight crew narration 318, flight system displays 320, and control panel display 322.

Flight crew interactions 314 contain the interactions between flight crew during a lesson. These flight crew interactions may include, for example, communications exchanged between flight crew members during an operation. Flight crew interactions 314 also may include actions taken by flight crew members such as, for example, manipulating various controls.

Flight instructor narration 316 contains the actions and comments made by a flight instructor during the lesson. Flight instructor narration 316 may include, for example, instructions given to the flight crew, clarifications on actions to be taken, verbalization of important points, goals, and other information about the lesson.

Flight crew narration 318 includes additional verbalization by the flight crew that may not normally be present during flight crew interactions 314. Flight crew narration 318 is a subset or type of flight crew interactions 314 in these examples. Flight crew narration 318 may include, for example, a flight crew member explaining what that flight crew member did, is doing, or about to do or look for during a lesson.

Flight system displays 320 present the displays that occur during flight crew interactions 314 that involve manipulating controls within the aircraft. Flight system displays 320 may show or emphasize particular displays of importance. Flight system displays 320 may show all displays relevant to the lesson or only a portion of the displays as they become relevant during the lesson.

Control panel display 322 may present an identification of controls being manipulated by the flight crew during flight crew interactions 314. Control panel display 322 may provide a better identification of the controls being manipulated in addition to the view provided in flight crew interactions 314.

The illustration of computer program product 300 in FIG. 3 is not meant to imply physical or architectural limitations to the manner in which different advantageous embodiments may be implemented. In other advantageous embodiments, other components in addition to or in place of the ones illustrated may be used. For example, in some advantageous embodiments, only flight training videos 304 may be present, without other programs or information. In yet other advantageous embodiments, computer recordable storage medium 302 also may include tests or quizzes to help reinforce student learning.

Computer recordable storage medium 302 may take various forms. For example, without limitation, computer recordable storage medium 302 may be a hard drive, a thumb drive, a flash memory, a digital versatile disk, a random access memory, or some other suitable storage media.

Figure 4:
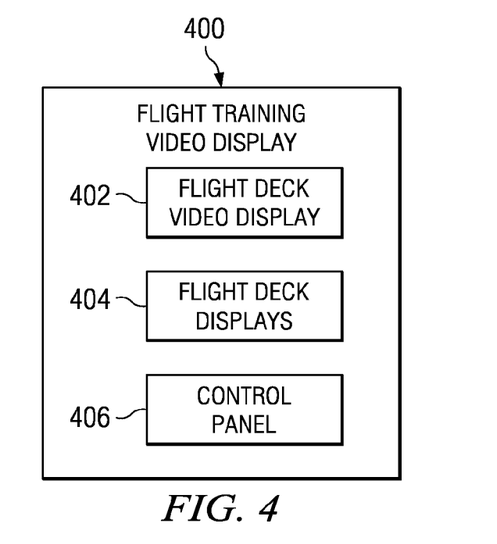
FIG. 4 is a block diagram illustrating a display that may be presented in a flight training video in accordance with an advantageous embodiment.

With reference now to FIG. 4, a block diagram illustrating a display that may be presented in a flight training video is depicted in accordance with an advantageous embodiment. In this example, flight training video display 400 is a block diagram illustrating components that may be presented on a display device for a flight training video, such as, for example, flight training video 312 in FIG. 3.

Flight training video display 400 includes flight deck video display 402, flight deck displays 404, and control panel 406. Flight deck video display 402 is a video of a flight crew made during a lesson. Flight deck video display 402 also may include the flight instructor. Flight deck video display 402 presents visual and audio information about interactions, instructions, and other information presented during a lesson. Flight deck displays 404 present the flight deck displays that are generated during the lesson. Control panel 406 may display and identify controls being manipulated during the lesson.

The illustration of flight training video display 400 in FIG. 4 is not meant to imply physical or architectural limitations to the manner in which different displays may be presented. For example, additional components may be used in place of or in addition to the ones illustrated. In one example, flight deck displays 404 may be arranged in a different manner from what is shown. As another example, flight deck displays 404 may wrap around flight deck video display 402.

In other advantageous embodiments, control panel 406 may not be presented in flight training video display 400. Flight training video display 400 is presented as a block diagram of components that may be present in a flight training video and not meant to imply limitations in the manner or arrangement of how information is presented.

Figure 5:
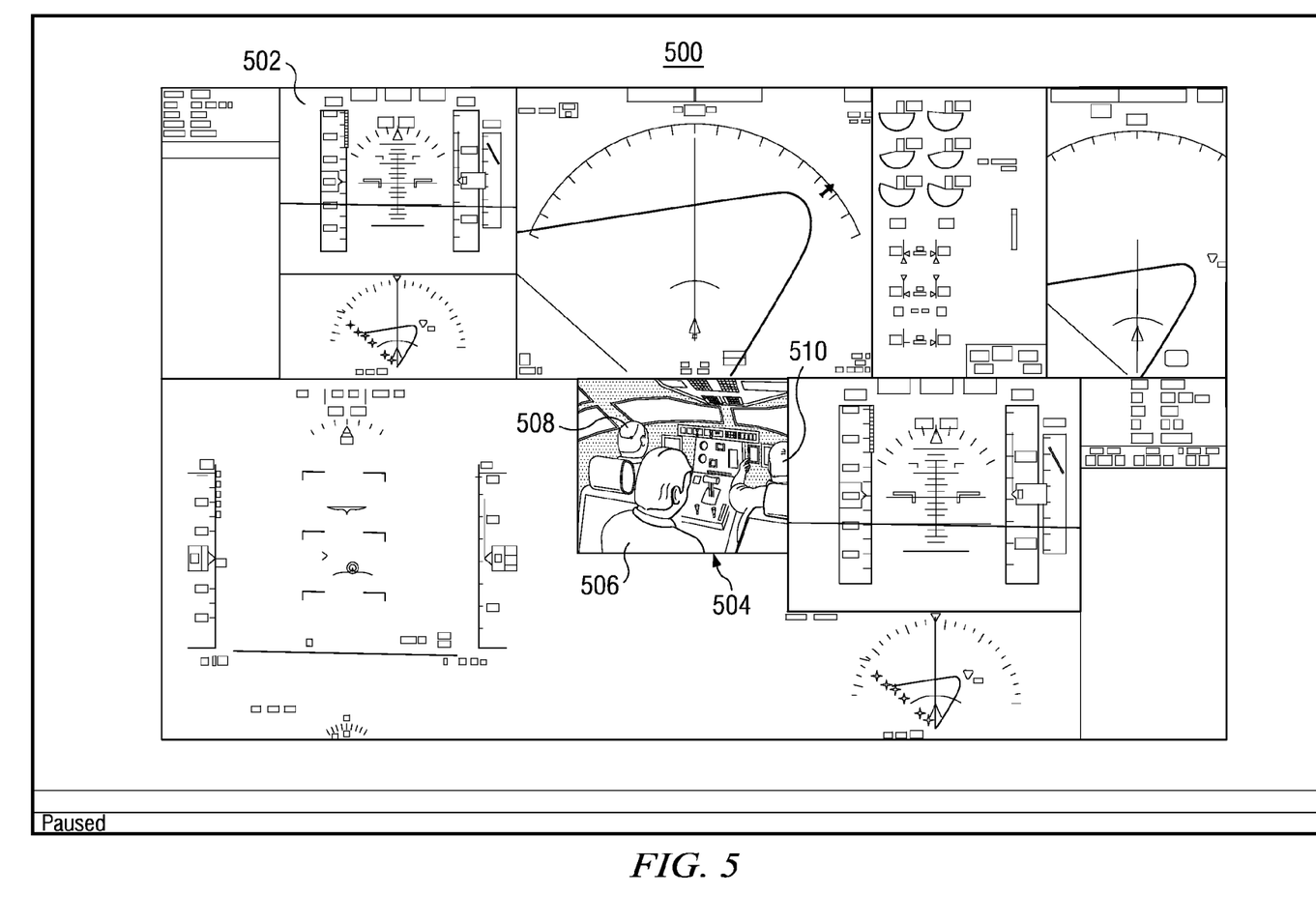
FIG. 5 is a diagram illustrating an example of a flight training video display in accordance with an advantageous embodiment.

With reference now to FIG. 5, a diagram illustrating an example of a flight training video display is depicted in accordance with an advantageous embodiment. Flight training video display 500 is an example of one implementation for a flight training video display 400 in FIG. 4.

As illustrated, flight training video display 500 presents flight deck displays 502, and flight deck video display 504. Instructor 506, crew member 508, and crew member 510 can be seen in flight deck video display 504. In this example, crew member 508 is the captain, while crew member 510 is the first officer. From this display, interactions between crew member 508 and crew member 510, as well as instructor 506, may be seen. Further, the communications, instructions, alerts, and other audio information may be presented by an audio device corresponding to the actions being taken in flight deck video display 504.

This illustration of flight training video display 500 in FIG. 5 is not meant to limit the manner in which other flight training video displays may be presented. For example, in other flight training video displays, a control panel may be displayed that identifies controls being manipulated by a particular crew member.

Figure 6:
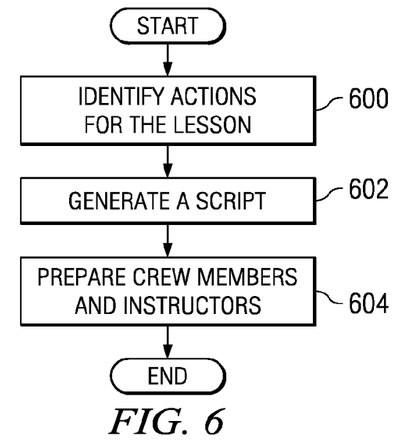
FIG. 6 is a flowchart of a process for planning a recording of a lesson in accordance with an advantageous embodiment.

With reference now to FIG. 6, a flowchart of a process for planning a recording of a lesson is depicted in accordance with an advantageous embodiment. The process illustrated in FIG. 6 may be implemented to create scripts of directions for a lesson that is to be recorded for use in a flight training video, using flight curriculum creation environment 100 in FIG. 1.

The process begins by identifying actions for the lesson (operation 600). These actions are ones that are to be emphasized and standardized for a particular lesson, regardless of who or where the lesson is being taught. The standardization of actions in operation 600 may insure that only those actions are performed. In other words, additional actions or less actions do not occur with respect to a particular lesson. Additionally, operation 600 may be used to standardize a training video for a particular airline to follow their own particular standardized operating procedures for their own student training and/or regulatory agency approval.

Thereafter, a script is generated (operation 602). The script may include talking points and/or specific verbiage and instructions. The crew members and instructors are then prepared for the lesson using the script (operation 604), with the process terminating thereafter. In preparing the crew members and instructors, the crew members may be other instructors or other experienced crew members. The different crew members and instructors may review the script to identify what should be emphasized and what actions should be performed during a particular lesson.

Figure 7:
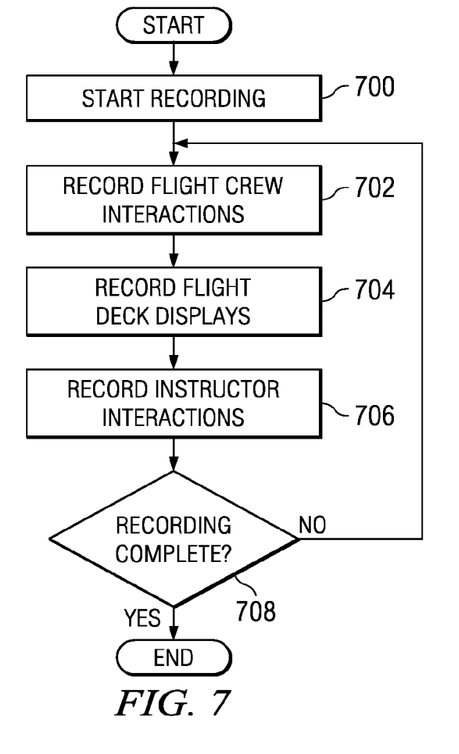
FIG. 7 is a flowchart of a process for recording information for creating a flight training video in accordance with an advantageous embodiment.

With reference now to FIG. 7, a flowchart of a process for recording information for creating a flight training video is depicted in accordance with an advantageous embodiment. The process illustrated in FIG. 7 may be implemented using a flight curriculum creation environment such as, for example, flight curriculum creation environment 100 in FIG. 1. In particular, the information needed for the video may be recorded using video camera system 108 and recording computer 104, in conjunction with flight deck simulator 102 in FIG. 1.

The process begins by starting the recording (operation 700). The recording may be started when the lesson begins or after a portion of the lesson has begun. For example, a number of actions are repeated in every lesson. These actions may not be needed for later training videos in a series of lessons since those actions have been covered in prior training videos. In starting the lesson, the flight crew members and instructors begin the different interactions for the lesson.

The process records the flight crew interactions (operation 702). In operation 702, the recorded interactions include the physical movements, as well as the communications between crew members. Additionally, these flight crew interactions also may include additional statements or explanations provided by a crew member that normally would not occur during a normal flight. These additional interactions may aid a student and/or instructor in what actions and communications should occur between flight crew members.

The process records flight deck displays (operation 704). In this operation, the flight deck displays are recorded as they are presented and changed during the lesson in response to flight crew interactions with each other and the different controls in the aircraft. All of the flight deck displays are recorded. At a later time, different displays may be selected for emphasis or presentation when the flight training video is generated.

The process records the instructor interactions (operation 706). The instructor interactions include gestures and audible statements made by the instructor during the lesson. While recording the flight instructor interactions, a standardization may be made with respect to preparing other instructors at a later point in time as to what actions and directions should be given by an instructor for a particular lesson.

The process then determines whether the recording is complete (operation 708). If the recording is not complete, the process returns to operation 702. Otherwise, the process terminates. The recording may be complete when the lesson is terminated. In some advantageous embodiments, a recording of the entire lesson is not necessary because certain actions are repeated again in every lesson. As a result, in later lessons, only a portion of the lesson may be recorded containing new actions.

The process illustrated in FIG. 7 may be started once each lesson or started at a number of different points in the lesson, depending on what actions are desired to be recorded for a particular flight training video.

Figure 8:
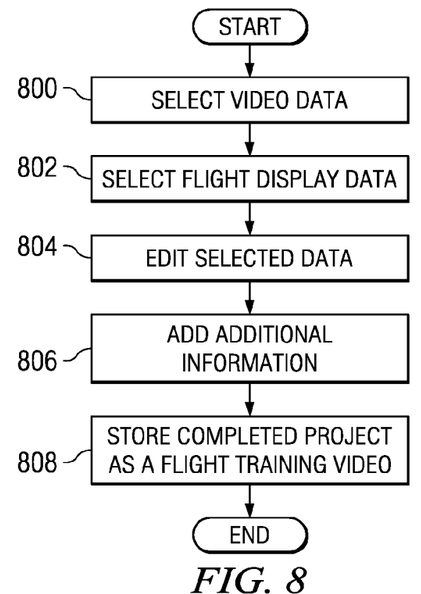
FIG. 8 is a flowchart of a process for creating a flight training video in accordance with an advantageous embodiment.

With reference now to FIG. 8, a flowchart of a process for creating a flight training video is depicted in accordance with an advantageous embodiment. The process illustrated in FIG. 8 may be implemented in a data processing system such as, for example, recording computer 104 in FIG. 1. This process may be implemented using flight training video process 136 in FIG. 1.

The process begins by selecting video data (operation 800). This video data may be video data generated during a lesson. The video data selected may be a portion of a lesson or the entire lesson depending on the particular implementation. The process then selects flight display data (operation 802). This operation may include identifying which flight displays may be useful for presentation.

The selected data is edited (operation 804). This editing may include, for example, changing flight displays that are presented in the flight training video based on actions taken by particular flight crew members. In this manner, the relevant displays to a particular action performed by a flight crew member may be presented so that a student and/or instructor may see the expected changes. The flight display data also may include, for example, a display of an outside view of the aircraft depending on the particular action. For example, a view of another aircraft or a landing strip may be provided.

The process adds additional information (operation 806). This operation is an optional one and may be used to provide other information to a user. For example, control panels and an indication of which controls on a control panel are being manipulated during flight crew interactions may be provided as part of the flight training video to provide an ability to better understand what actions have been taken.

The process then stores the completed project as a flight training video (operation 808), with the process terminating thereafter. Operation 808 may include storing the flight training video on a computer recordable storage media for distribution to students and/or instructors.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of computer usable or readable program code, which comprises one or more executable instructions for implementing the specified function or functions.

In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

Thus, the different advantageous embodiments provide a method, apparatus, and computer program code for flight crew training. In these different examples, the flight crew interactions and flight deck displays occurring during a lesson are recorded. The flight training video is formed from these recordings.

In this manner, the actions that are to be performed in a particular lesson may be standardized by providing students and/or instructors a recording of exactly what should occur during a particular lesson. This type of standardization may be performed within a particular airline or for a particular school. By providing this video along with other flight training curriculum materials, the time needed for students and/or instructors to prepare for a lesson may be reduced, students achieve a better overall understanding of airplane operation, in addition to providing for increased curriculum standardization across training facilities around the world.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments.

The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for improving utilization of a flight training device via improving standardizing a goal, a teaching point, and a procedure, of a flight training curriculum for preparing for instruction of a lesson presented at differing locations around the world in a flight training device, relative to preparing for instruction of the lesson without the method, the method comprising:
identifying an action to be standardized and emphasized in the flight training curriculum;
scripting, after identifying the action, specific verbiage and instructions for instructors performing as a flight crew;
creating a dynamic visual reference such that every lesson presented at differing locations around the world comprises identical information and emphasis for the procedure, an operation, and a system, via:
adding a communications link to an electronic flight bag and a flight deck simulator;
connecting the communications link to a recording computer;
recording, using a video camera system, instructors performing as a flight crew and executing scripted flight crew interactions during preparation of the dynamic visual reference for the lesson to form recorded flight crew interactions;
supplying digital readouts, occurring during the lesson from a flight deck display and the electronic flight bag as display data to the recording computer to form recorded flight deck displays;
recording video data comprising:
flight instructor narration comprising: clarification of the action to be taken, an important point, and the goal, of the lesson; and
flight crew narration comprising instructors performing as the flight crew narrating an explanation of what a flight crew member should look for, or the action:
occurring, completed, or forthcoming;
storing video data and display data as raw data in the recording computer;
generating, after storing the video data and the display data as raw data in the recording computer, the dynamic visual reference showing exact information, operations, actions, and interactions, to be emphasized during the lesson, presented at differing locations around the world, via editing the raw data and identifying:
in a control panel display in the dynamic visual reference, controls being manipulated by the instructors performing as the flight crew;
in a portion of the dynamic visual reference, a flight system display as the flight system becomes relevant during the lesson; and
providing a capability for multiple reviews of the dynamic visual reference before the lesson begins via storing the dynamic visual reference on a number of computer recordable storage media, such that each time preparing for instruction of the lesson occurs, the dynamic visual reference provides standardization that comprises identical: information, emphasis, and a duration of presentation for each procedure, each operation, and each system in the flight training curriculum for preparing for instruction of the lesson presented at differing locations around the world in the flight training device.

2. The method of claim 1, further comprising:
limiting actions presented in the dynamic visual reference to only actions identified to be standardized and emphasized.

3. The method of claim 1 further comprising:
generating a presentation of the controls being manipulated by the instructors performing as the flight crew during the training session, wherein a display has a timing that identifies a control as the control is being manipulated during the recorded flight crew interactions; and
including the presentation of the controls being manipulated by the instructors performing as the flight crew in the flight training video.

4. The method of claim 1 further comprising:
distributing the number of computer recordable storage media to at least one of a number of students and a number of instructors.

5. The method of claim 4 further comprising:
playing the flight training video during preparation for the lesson corresponding to the training session.

6. The method of claim 1, wherein the recorded flight deck displays include at least primary flight display, multifunction display, navigation display, and head up display.

7. The method of claim 6, wherein the primary flight display includes at least airspeed, altitude, heading, attitude, vertical speed, and glideslope.

8. The method of claim 6, wherein the multifunction display includes at least communications, auxiliary power unit (APU), fuel, and electrical systems.

9. The method of claim 6, wherein the navigation display includes at least heading/track, flight plan route, waypoint, airport, navigational aid, and weather information.

10. The method of claim 6, wherein the navigation display includes a moving map presentation.

11. The method of claim 6, wherein the head up display provides projected airplane flight data on the head up display combiner mounted in front of a windshield.

12. The method of claim 1, wherein in forming the flight training video, the flight crew and the instructor are visible.

13. A method of improving utilization of a flight training device via improving comprehension of material in a manual for preparing for presentation of a lesson in a flight deck simulator, relative to comprehension of material in the manual for preparing for presentation of the lesson without using the method, the method comprising utilizing a data processing system comprising:
a bus;
a communications unit connected to the bus;
a storage device connected to the bus, wherein the storage device includes program code; and
a processor unit connected to the bus, wherein the processor unit executes the program code to record interactions of instructors performing as a flight crew during the lesson to form recorded flight crew interactions; record flight deck displays occurring during the lesson to form recorded flight deck displays; record instructor directions during a training session to form recorded instructor directions, instructor directions including instructor narration regarding lesson information, and form a flight training video from the recorded flight crew interactions, the recorded flight deck displays, and the recorded instructor directions, and to store the flight training video on a number of computer recordable storage media, such that comprehension of the material in the manual for preparing for presentation of the lesson in the flight deck simulator exceeds comprehension of the material in the manual without using the method, via a consistent and identically reviewable presentation of a dynamic visual reference demonstrating a desired standard of performance of an operation in the flight deck simulator via:
identifying an action to be standardized and emphasized in the flight training curriculum;
scripting, after identifying the action, specific verbiage and instructions for instructors performing as the flight crew;
creating the dynamic visual reference such that every lesson presented at differing locations around the world comprises identical information and emphasis for a procedure, the operation, and a system, via:
adding a communications link to an electronic flight bag and the flight deck simulator;
connecting the communications link to a recording computer;
recording, using a video camera system, instructors performing as the flight crew and executing scripted flight crew interactions during preparation of the dynamic visual reference for the lesson to form recorded flight crew interactions;
supplying digital readouts, occurring during the lesson from a flight deck display and the electronic flight bag as display data to the recording computer to form recorded flight deck displays;
recording video data comprising:
flight instructor narration comprising: clarification of the action to be taken, an important point, and a goal of the lesson; and
flight crew narration comprising instructors performing as the flight crew narrating an explanation of what a flight crew member should look for, or the action: occurring, completed, or forthcoming;
storing video data and display data as raw data in the recording computer;
generating, after storing the video data and the display data as raw data in the recording computer, the dynamic visual reference showing exact information, operations, actions, and interactions, to be emphasized during the lesson, presented at differing locations around the world, via editing the raw data and identifying:
in a control panel display in the dynamic visual reference, controls being manipulated by the instructors performing as the flight crew;
in a portion of the dynamic visual reference, a flight system display as the flight system becomes relevant during the lesson; and
providing a capability for multiple reviews of the dynamic visual reference before the lesson begins via storing the dynamic visual reference on the number of computer recordable storage media, such that each time preparing for instruction of the lesson occurs, the dynamic visual reference provides standardization that comprises identical: information, emphasis, and a duration of presentation for each procedure, each operation, and each system in the flight training curriculum for preparing for instruction of the lesson presented at differing locations around the world in the flight training device.

14. The method of claim 13, further comprising the data processing system wherein the flight crew interactions comprise crew communications, crew actions, and verbalizations emphasizing the action being taken by a particular crew member.

15. The method of claim 13, further comprising the data processing system:
generating a presentation of the controls being manipulated by the instructors performing as the flight crew during the training session, wherein a display has a timing that identifies a control as the control is being manipulated during the recorded flight crew interactions; and
including the presentation of the controls being manipulated by the instructors performing as the flight crew in the flight training video.

16. The method of claim 13, further comprising the data processing limiting actions presented in the dynamic visual reference to only actions identified to be standardized and emphasized.

17. The method of claim 16, further comprising the data processing system wherein the processor unit further executes the program code to play the flight training video during preparation for the lesson corresponding to the training session.

18. A method for improving utilization of a flight training device via improving: standardizing interpretation of training manuals used, and reducing time required, in preparing for a lesson in a flight deck simulator, relative to preparing for the lesson in the flight deck simulator without using the method, the method comprising utilizing a computer program product for flight crew training, the computer program product comprising:
　a computer recordable storage medium;
　program code, stored on the computer recordable storage medium, for recording flight crew interactions during the lesson to form recorded flight crew interactions;
　program code, stored on the computer recordable storage medium, for recording flight deck displays occurring during the lesson to form recorded flight deck displays;
　program code, stored on the computer recordable storage medium, for recording instructor directions during a training session to form recorded instructor directions, instructor directions including instructor narration regarding lesson information;
　program code, stored on the computer recordable storage medium, for forming a flight training video from the recorded flight crew interactions, the recorded flight deck displays, and the recorded instructor directions; and
　program code, stored on the computer recordable storage medium, for storing the flight training video on a number of computer recordable storage media such that interpretation of training manuals used increases, and time required decreases, in preparing for a lesson in a flight deck simulator, relative to preparing for the lesson in the flight deck simulator without using the method, via a consistent and identically reviewable presentation of a dynamic visual reference demonstrating a desired standard of performance of an operation in the flight deck simulator via:
　　identifying an action to be standardized and emphasized in the flight training curriculum;
　　scripting, after identifying the action, specific verbiage and instructions for instructors performing as the flight crew;
　　creating the dynamic visual reference such that every lesson presented at differing locations around the world comprises identical information and emphasis for a procedure, the operation, and a system, via:
　　　adding a communications link to an electronic flight bag and the flight deck simulator;
　　　connecting the communications link to a recording computer;
　　　recording, using a video camera system, instructors performing as the flight crew and executing scripted flight crew interactions during preparation of the dynamic visual reference for the lesson to form recorded flight crew interactions;
　　　　supplying digital readouts, occurring during the lesson from a flight deck display and the electronic flight bag as display data to the recording computer to form recorded flight deck displays;
　　　recording video data comprising:
　　　　flight instructor narration comprising: clarification of the action to be taken, an important point, and a goal of the lesson; and
　　　　flight crew narration comprising instructors performing as the flight crew narrating an explanation of what a flight crew member should look for, or the action: occurring, completed, or forthcoming;
　　　storing video data and display data as raw data in the recording computer;
　　　generating, after storing the video data and the display data as raw data in the recording computer, the dynamic visual reference showing exact information, operations, actions, and interactions, to be emphasized during the lesson, presented at differing locations around the world, via editing the raw data and identifying:
　　　　in a control panel display in the dynamic visual reference, controls being manipulated by the instructors performing as the flight crew;
　　　　in a portion of the dynamic visual reference, a flight system display as the flight system becomes relevant during the lesson; and
　　providing a capability for multiple reviews of the dynamic visual reference before the lesson begins via storing the dynamic visual reference on the number of computer recordable storage media, such that each time preparing for instruction of the lesson occurs, the dynamic visual reference provides standardization that comprises identical: information, emphasis, and a duration of presentation for each procedure, each operation, and each system in the flight training curriculum for preparing for instruction of the lesson presented at differing locations around the world in the flight training device.

19. The method of claim 18, further comprising preparing for the lesson in the flight deck simulator comprising an instructor preparation and a student preparation.

20. The method of claim 18, further comprising the computer program product comprising:
　program code, stored on the computer recordable storage medium, for generating a presentation of the controls being manipulated by the instructors performing as the flight crew during the training session, wherein a display has a timing that identifies a control as the control is being manipulated during the recorded flight crew interactions; and
　program code, stored on the computer recordable storage medium, for including the presentation of the controls being manipulated by the instructors performing as the flight crew in the flight training video.

21. The method of claim 18, further comprising the computer program product comprising:
　program code, stored on the computer recordable storage medium, for distributing the number of computer recordable storage media to at least one of a number of students and a number of instructors.

* * * * *